United States Patent [19]

Akiba et al.

[11] Patent Number: 4,714,850
[45] Date of Patent: Dec. 22, 1987

[54] STEPPING MOTOR

[75] Inventors: Yasuhiro Akiba, Osaka; Masato Namba, Katano; Seiji Kikuchi, Nishinomiya; Hidenobu Soejima, Higashiosaka, all of Japan

[73] Assignee: Matsushita Electric Industrial Co., Ltd., Kadoma, Japan

[21] Appl. No.: 887,031

[22] PCT Filed: Nov. 5, 1985

[86] PCT No.: PCT/JP85/00611
§ 371 Date: Jul. 8, 1986
§ 102(e) Date: Jul. 8, 1986

[87] PCT Pub. No.: WO86/03071
PCT Pub. Date: May 22, 1986

[30] Foreign Application Priority Data

Nov. 8, 1984 [JP] Japan .................. 59-235536

[51] Int. Cl.$^4$ ............................ H02K 37/00
[52] U.S. Cl. .................... 310/49 R; 310/43; 310/112
[58] Field of Search ............ 310/49, 162–165, 310/90, 112, 43

[56] References Cited

U.S. PATENT DOCUMENTS

| 4,107,559 | 8/1978 | Patel | 310/49 |
| 4,174,485 | 11/1979 | Soden | 310/49 X |
| 4,381,747 | 5/1983 | Kobayashi | 310/49 X |

Primary Examiner—Donovan F. Duggan
Attorney, Agent, or Firm—Cushman, Darby & Cushman

[57] ABSTRACT

Relating to a stepping motor to be used for paper feedings or type head movements in office automation apparatus such as printers or typewriters.

A stator (1) is constituted by moulding stator yokes (2), (3), (4), and (5) monolithically by resin with using their inner radius as their reference, and one side of a rotary shaft (11a) of a rotor (11) is supported by a bearing (12a) of a bearing holder member (1a) which is provided on the one-side end plane of a cylinder member of sad stator (1), and at the same time, a bracket (14) holding a bearing (12b) supporting one side of the rotary shaft (11a) of the rotor (11) is inserted into an opening side inner part of said cylinder member.

By the above constitution, centering of the rotary shaft can be carried out easily and the gap between the rotor and the inner radius of the stator can be maintained also easily, then as a result of it, low-cost and high-quality stepping motors can be offered.

6 Claims, 11 Drawing Figures

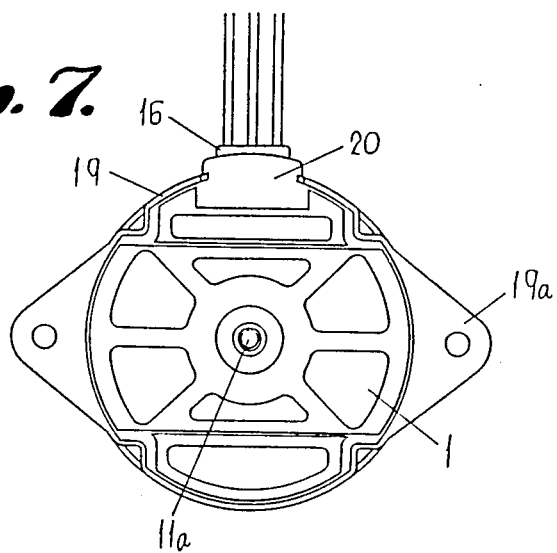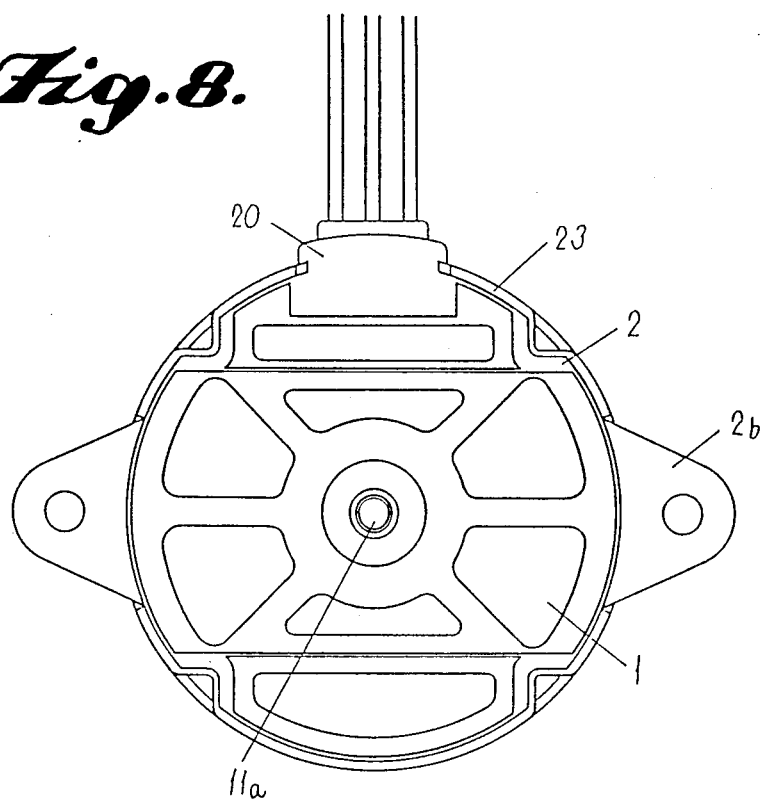

STEPPING MOTOR

TECHNICAL FIELD

The present invention relates to a stepping motor to be used for paper feedings or type head movements of office automation apparatus such as printers or typewriters.

BACKGROUND ART

Hitherto, a stepping motor of this kind is constituted in a state that plural stator yokes having plural pole teeth formed by press process are placed in a manner that their respective pole teeth interleave to each other with a uniform interval, that is, with a position of 180° lagging in the electric angle, or are lagged in a manner that they are mutually facing back to back as much as the step angle, that is, in a manner that they are 90° lagging in the electric angle.

However, it is difficult to constitute a stator inner radius part which positions with a small gaps with a rotor periphery at its respective pole teeth by combining plural stator yokes; and since bearings for supporting a rotor shaft are held by side plates fixed to stator yokes which position at both ends of the stator, the centering of its two bearings is also difficult.

Consequently, in stepping motors of prior art, defects in making steps such as touching between rotor and stator or twisting of a rotor shaft have happened often.

For such the constitution of prior art, a configuration such as shown in FIG. 1 was proposed, as is known by a Japanese Unexamined Published Application No. Sho 59-63972.

In the configuration shown in FIG. 1, since a stator 31 is monolithically moulded by resin with using the inner radius of stator yokes 32 and 33 as its reference, a centering process between the inner radius part 31a of the stator 31 and a bearing 34 can be achieved easily. And by the similar reason, since a welding process can be removed from the assembly process, defects such as locking of a rotor or anomalous sounding due to welding spatter are distinguished, and thereby it becomes possible to offer high quality motors with less process defect. Moreover, since parts can be added one by one to a stator which is monolithically moulded with resin, that is, since being different from a building-up of combinations of tentatively assembled parts on intermediate stages, the raw materials are directly assembled into a motor, auxiliary components such as tapes and tubes needed for protecting and holding coil winding wires and others become unnecessary, making the automation of assembly process easier.

On the other hand of such the advantage, however, in the configuration of FIG. 1, on the outer radius part of a stator 31 which is set into a frame 36 having a bearing 35, center deviations in the inner and outer radii included in individual components of stator yokes 32 and 33 take place. That is, the reference has been set on the inner radii of the stator yokes 32 and 33, all of their deviations appear on the outer radius of the stator 31. Consequently, there have been problems that the centering of the bearings 34 and 35 as well as the maintenance of a small gap between the rotor 37 and the inner radius of the stator become difficult.

Also there has been a problem that the separated windings for respective phases of coil windings 38 and 39 which are separated by separators 31b of a stator coil winding part introduce an increase of the wire winding process time.

DISCLOSURE OF THE INVENTION

Then, the main object of the present invention is to offer stepping motors wherein the centering of bearings can be achieved easily, and the gap between a rotor and a stator can be maintained easily.

And, another object of the present invention is to offer high-quality stepping motor which is low-cost and to which an automatic assembly process is applicable.

The above-mentioned object of the present invention can be achieved by the following constitution. That is, a stepping motor of the present invention is the one that a stator is constructed by moulding monolithically plural stator yokes with resin using their inner radii as the datum, and also one side of a rotary shaft of a rotor is supported by a bearing of a bearing holder part provided end plane on one side of a cylinder member of the above-mentioned stator, and at the same time, a bracket for holding a bearing which supports other side of the rotary shaft of the above-mentioned rotor is inserted into an opening side of an inner radius part of the above-mentioned cylinder member.

Actually, a stepping motor of the present invention is provided with a rotor which includes a columnar- or cylindrical-shaped permanent magnet magnetized in multiple poles on its periphery and a rotary shaft on its center, a cylinder member which is moulded with resin in a state that at least a pair of stator yokes having an inner radius that is slightly larger than an outer radius of the above-mentioned rotor and formed with plural pole teeth with a uniform interval in the axial direction are combined in a manner that their pole teeth are placed alternatively and on a same periphery, a bearing holder member which is formed on one side end plane and is provided at its center with a bearing for holding a rotary shaft of the above-mentioned rotor in rotatable manner, a coil bobbin consisting of an insulating material and formed on an outer radius part of the above-mentioned cylinder member and on the surface of a disk part of the above-mentioned stator yoke, a stator coil winding wound on the above-mentioned coil bobbin, a bracket which is inserted in an inner radius part of the opening side of the above-mentioned cylinder member and is provided with a bearing for holding the above-mentioned rotor shaft in rotatable manner on its center, and a frame of a cup shape to which the above-mentioned stator is inserted.

And, a stepping motor of the present invention includes, in the above configuration, the one wherein the cylinder member, bearing holder member, and the coil bobbin are monolithically moulded with the same resin.

Furthermore, in the stepping motor of the present invention, the above-mentioned bracket is made in a manner that it has a projection of the same radius with the inner radius of the opening side of the above-mentioned cylinder member and this projection is inserted into the inner radius part of the above-mentioned cylinder member.

BRIEF DESCRIPTION OF THE DRAWINGS

FIG. 7 is a front view of one embodiment of the present invention, and FIG. 8 and FIG. 9 are front views showing embodiments in the case that the present invention is applied to a large and heavy motor.

BEST MODE FOR EMBODYING THE INVENTION

In the following, one embodiment of the present invention is explained in detail based on drawings.

Figure 2:
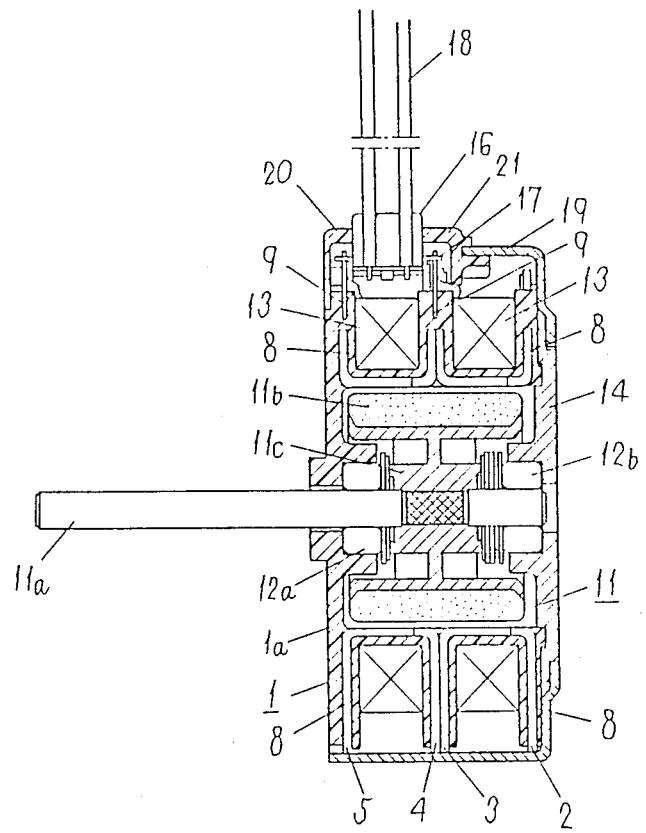
FIG. 2 is a cross-sectional view of a stepping motor in one embodiment of the present invention.
Figure 3:
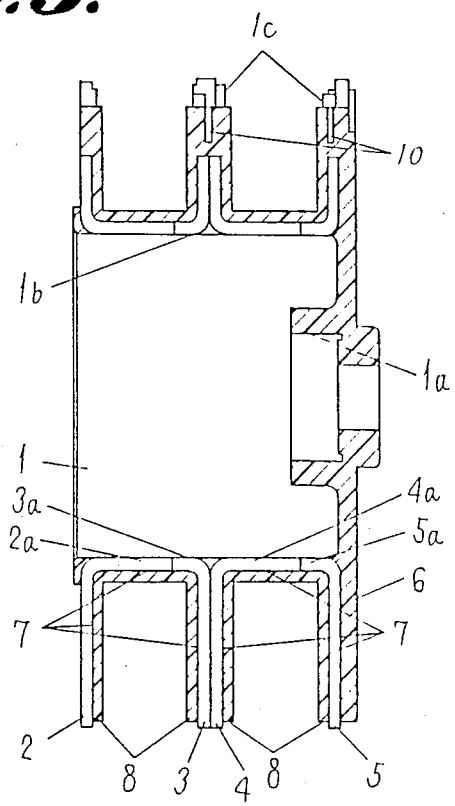
FIG. 3 is a cross-sectional view of a stator of the above embodiment.
Figure 4:
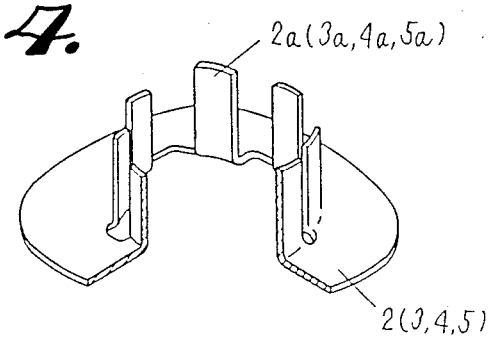
FIG. 4 is a perspective view showing an example of a stator yoke of said stepping motor.
Figure 5:
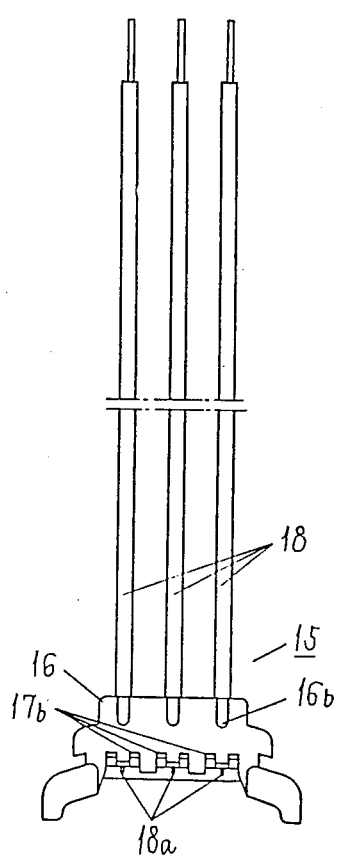
FIG. 5 is a front view of a terminal assembly used in one embodiment of the present invention, FIGS. 6 (a), (b), and (c) are a front view, a plan view, and a side cross-sectional view, respectively, of a terminal part used in one embodiment of the present invention.
Figure 6A:
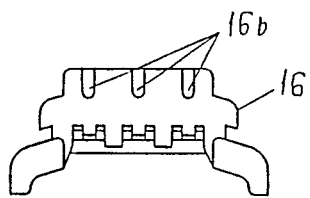
Figure 6B:
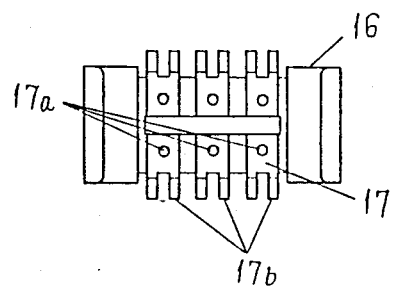
Figure 6C:
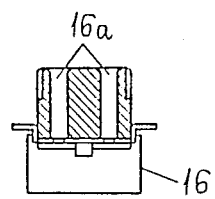

FIG. 2 is a cross-sectional view of one embodiment of the present invention. A stator 1 is the one that stator yokes 2, 3, 4, and 5 having plural pole teeth 2a, 3a, 4a, and 5a arranged with a constant interval as shown in FIG. 4 are monolithically moulded with into a cylindrical housing 6 as shown in FIG. 3. At this time, by a resin casting mould, taking the inner radius of the pole teeth 2a, 3a, 4a, and 5a as the reference, in a state that the first stator yoke comprising the stator yokes 2 and 3 and the second stator yoke comprising the stator yoke 4 and 5 respectively interleave with the pole teeth 2a and 3a and those 4a and 5a, that is, the pole teeth 2a and 3a and those 4a and 5a are positioned relatively with a uniform lag of an electric angle of 180°, and the pole teeth 3a and 4a of the stator yokes 3 and 4 being disposed back to back on the same axis are positioned relatively with the step angle of the motor, that is, the pole teeth 3a and 4a are positioned relatively with a lag of an electric angle of 90°. Also, at the time of the above-mentioned monolithic moulding process, coil bobbins 8 of coil windings 13 are formed with resin on the outer surface part 7 of the stator yokes 2, 3, 4 and 5, and in a part of coil bobbins 8 plural number and plural lines of holes 10 to which terminals 9, to which ends of the stator coil windings 13 are connected, are inserted are formed. Furthermore, a holding part 1a of a bearing 12 for supporting a rotor 11 in rotatable manner is also formed coaxially with respect to a stator inner radius part 1b which is constituted by pole teeth 2a, 3a, 4a, and 5a. To the stator 1 formed through this resin monolithic moulding process, a bearing 12a and the terminal 9 are thrusted into and fixed, then coil windings 13 are wound on the bobbin 8 and their ends are connected to the terminals 9. A rotor 11, which is provided with a cylinder shaped permanent magnet 11b magnetized in a multiple pole on its periphery and wherein a rotor shaft 11a is fixed at its center by a resin 11c, is inserted to the inner radius part 1b of this stator 1, by being inserting one end of the rotor shaft 11a into the bearing 12a. 14 is a bracket into which a bearing 12b is thrusted and held, by being inserting the other end of rotor shaft 11a, to insert and fix it into the inner radius part of the stator 1. Next, a terminal assembly 15 shown in FIG. 5 consists of a terminal 17, a terminal member 16 which is provided with lead wire insertion holes 16a and is resin-moulded monolithically and lead wires 18, then the lead wires 18 are inserted into lead wire insertion holes 16a of the terminal member 16 and the lead wires 18 are fixed mechanically to the side plane part 16b of the terminal member 16 by the ultrasonic melting. Then one ends 17a of the terminal 17 exposed on the rear face of the terminal member 16 are connected to core wire 18a of lead wires. This terminal assembly 15 is inserted into a notch part 1c of the stator 1 shown in FIG. 3, keeping the engagement between the stator side terminals 9 and the one ends 17b of terminal assembly side terminal 17, thereby terminals 19 and the terminal 17 are connected. Thereafter, as is shown in FIG. 2 and FIG. 7, covers 20 and 21 which are for insulation and dust-proof are attached, and thereto a frame 19 provided with a motor mounting flange 19a is inserted and then edge of the frame opening side is caulked, thereby the frame 19 and the stator 1 are fixed, and thus the assembling is completed.

Figure 9:
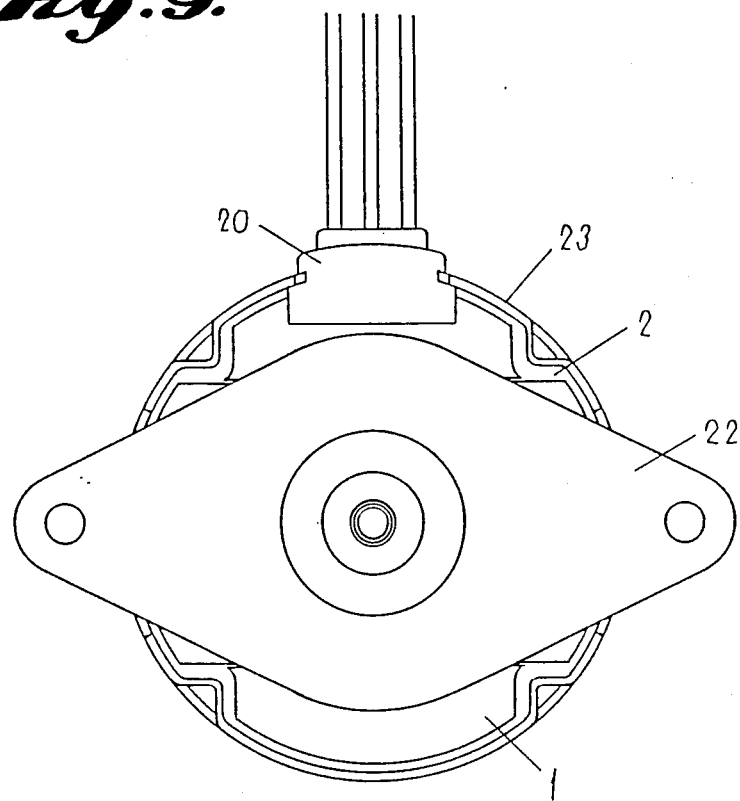

Hereupon, in the case of the above-mentioned constitution, in case that the motor is fixed by installation thereof to a chassis, the frame 19 is fixed to the chassis, whereas the stator 1 which forms a unit body with the rotor output shaft 11a is not directly fixed to the chassis. Consequently, the weight ratio of the stator 1 to the frame 19 becomes very large, then, when an impact is given to the motor, particularly in such case that the motor is large and heavy, the motor assembly position, i.e., the position of the stator 1 with respect to the frame 19 has a possibility to be shifted. In such the case, although a small amount of cost increase is induced, it can be improved by making a motor mounting flange 2b, by extending the outer edge of the stator yoke 2 on the output shaft side as is shown in FIG. 8, or by fixing a motor mounting flange 22 to the stator yoke 2 on the output shaft side, as is shown in FIG. 9, by any method such as welding which can fix more strongly than the caulking fixing based on the plasticity deformation of metals. And, through the use of such the method, counterplan against any possible changes in shape design of the motor mounting flange 22 becomes easier.

The frame 23 for the above case becomes a simple cupshaped cylinder to be used for forming a magnetic circuit and dust-proof.

Figure 1:
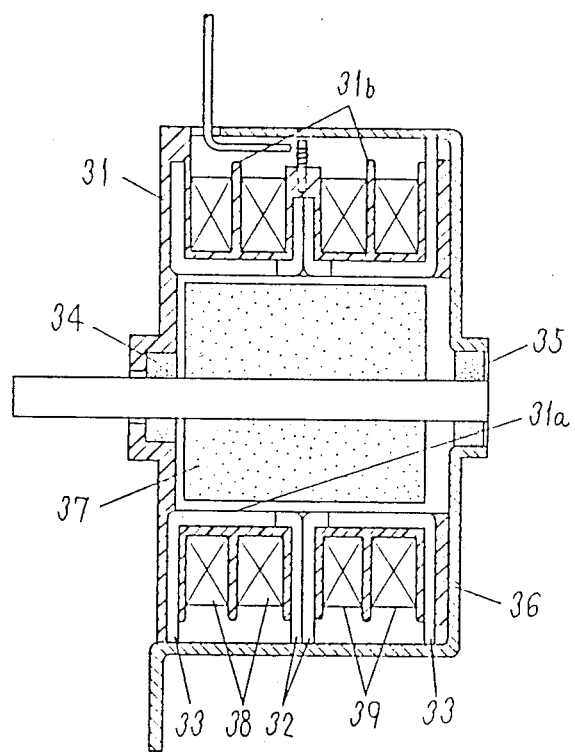
FIG. 1 is a cross-sectional view of a conventional stepping motor.

Hereupon, although a permanent magnet 11b of cylindrical shape has been used for the rotor 11 in the embodiment described above, it is needless to mention that a permanent magnet of columnar shape as shown in FIG. 1 can also be used.

POSSIBLE UTILITY IN INDUSTRY

As is clear from the above explanation, since in the present invention the assembly is carried out by using the pole teeth inner radius as its datum, centering of the bearings of the maintenance of the gap between the rotor and the inner radius of the stator can be achieved easily, and as a result, low- cost and high-quality stepping motor can be offered.

We claim:
1. A stepping motor comprising:
   a rotor which includes a columnar- or cylindrical-shaped permanent magnet magnetized in multiple poles on its periphery and a rotary shaft on its center,
   a pair of first stator yokes having an inner radius that is slightly larger than an outer radius of said rotor and having plural pole teeth with uniform intervals in the axial direction and arranged so that a pair of said pole teeth are placed alternately and on a same periphery,
   a pair of second stator yoke having an inner radius that is slightly larger than the outer radius of said rotor and having plural pole teeth with uniform intervals in the axial direction and arranged so that a pair of said pole teeth are placed alternately and on a same periphery and are disposed back to back on a same axis of said first stator yokes with a rotation of stepping angle, a cylindrical housing monlithically resin-moulded together with said first yokes and said second yokes, a bearing holder member on one side end plane of said cylindrical housing and provided at its center with a bearing for rotatably holding said rotary shaft, a coil bobbin member formed on an outer radius part of said cylindrical housing, a stator coil winding wound on said coil bobbin, a bracket which is inserted in an inner radius part of an open side of said cylindrical housing and is provided with a bearing for rotatably holding said rotor shaft, and a frame of cup shape in which said stator is inserted and which combines said bearing holding member with said bracket.

2. A stepping motor of claim 1, provided with a terminal to which stator coil ends are connected on a part of the outer radius side of the coil bobbin.

3. A stepping motor of claim 1, wherein the rotor is constituted with a cylinder-shaped permanent magnet, and the rotary shaft is fixed to said permanent magnet with resin.

4. A stepping motor comprising:

a rotor which includes a columnar- or cylindrical-shaped permanent magnet magnetized in multiple poles on its periphery and a rotary shaft on its center, a pair of first stator yokes having an inner radius that is slightly larger than the outer radius of said rotor and having a plural pole teeth with uniform intervals in the axial direction and arranged so that a pair of said pole teeth are placed alternately and on a same periphery, a pair of second stator yokes having an inner radius that is slightly larger than the outer radius of said rotor having plural pole teeth with uniform intervals in the axial direction and that a pair of said pole teeth are placed alternately and on a same periphery and disposed back to back on a same axis of said first stator yokes with a rotation of stepping angle, a cylindrical housing monlithically resin-moulded together with said first yokes and said second yokes, a bearing holder member on one side end plane of said cylindrical housing and provided at its center with a bearing for rotatably holding said rotary shaft, a coil bobbin member formed on an outer radius part of said cylindrical housing, a stator coil winding wound on said coil bobbin, a bracket which has a projected part of the same radius as an open side inner radius part of said cylindrical housing, said projected part being inserted in said inner radius part of said cylindrical housing and being provided with a bearing for rotatably holding said rotor shaft, and a frame of cup shape in which said stator is inserted and which combines said bearing holder member with said bracket.

5. A stepping motor of claim 4 provided with a terminal to which stator coil ends are connected on a part of the outer radius side of the coil bobbin.

6. A stepping motor of claim 4 wherein the rotor is comprised with a cylinder-shaped permanent magnet, and the rotary shaft is fixed to said permanent magnet with resin.

* * * * *